US006788182B2

(12) United States Patent
Young et al.

(10) Patent No.: US 6,788,182 B2
(45) Date of Patent: Sep. 7, 2004

(54) METALIZED POLYESTER FILM WITH HEAT-SEAL LAYER ON OPPOSITE SIDE FOR FLYBACK TRANSFORMER APPLICATION

(75) Inventors: Patrick H. Young, Canal Winchester, OH (US); Junaid A. Siddiqui, Richmond, VA (US)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 0 days.

(21) Appl. No.: 10/233,954

(22) Filed: Sep. 3, 2002

(65) Prior Publication Data

US 2004/0041678 A1 Mar. 4, 2004

(51) Int. Cl.[7] .................................................. H01F 5/00
(52) U.S. Cl. ...................... 336/200; 336/223; 336/232; 29/602.1
(58) Field of Search ................................ 336/223, 232; 29/602.1

(56) References Cited

U.S. PATENT DOCUMENTS

| | | | |
|---|---|---|---|
| 3,154,461 A | 10/1964 | Johnson | 161/116 |
| 3,980,611 A | 9/1976 | Anderson et al. | 260/40 |
| 4,198,458 A | 4/1980 | Mitsuishi et al. | 428/212 |
| 4,204,263 A | 5/1980 | Onoue | 363/68 |
| 4,274,025 A | 6/1981 | Nerurkar et al. | 310/215 |
| 4,654,775 A | 3/1987 | Nero | 363/68 |
| 5,060,128 A | 10/1991 | Onodera et al. | 363/20 |
| 5,093,064 A | 3/1992 | Utsumi et al. | 264/210.7 |
| 5,132,356 A | 7/1992 | Siddiqui | 524/493 |
| 5,241,293 A | 8/1993 | Okumura | 336/183 |
| 5,278,221 A | 1/1994 | Siddiqui | 524/493 |
| 5,540,974 A | 7/1996 | Hoseki et al. | 428/141 |
| 5,595,819 A | 1/1997 | Anderson et al. | 428/330 |
| 5,626,959 A | 5/1997 | Mills et al. | 428/331 |
| 5,656,222 A | 8/1997 | Berry et al. | 264/131 |
| 5,738,926 A | 4/1998 | Kinoshita | 428/141 |
| 5,953,202 A | 9/1999 | Walters et al. | 361/311 |
| 5,985,437 A | 11/1999 | Chappell, Jr. et al. | 428/336 |
| 6,018,454 A | 1/2000 | Hatada et al. | 361/314 |
| 6,117,532 A | 9/2000 | Siddiqui et al. | 428/216 |
| 6,287,667 B1 | 9/2001 | Kinoshita et al. | 428/141 |

FOREIGN PATENT DOCUMENTS

WO         99/33910         7/1999

Primary Examiner—Anh Mai
(74) Attorney, Agent, or Firm—RatnerPrestia (57) ABSTRACT

An electrical component employing a metalized composite film with a heat-seal layer is disclosed. The use of the heat-seal layer in the disclosed configuration allows a wound film capacitor integral with a primary coil to be made without there being a need to impregnate the wound film unit with an epoxy or other resin, thus saving substantial manufacturing time.

26 Claims, 4 Drawing Sheets

METALIZED POLYESTER FILM WITH HEAT-SEAL LAYER ON OPPOSITE SIDE FOR FLYBACK TRANSFORMER APPLICATION

FIELD OF THE INVENTION

This invention relates to metalized elements. More particularly, it relates to metalized elements made from polyester film composites, and more particularly to electrical components comprising wound film capacitors for use in flyback transformer circuits.

BACKGROUND OF THE INVENTION

Flyback transformers are used in the horizontal deflection circuit for cathode ray tubes (CRT), critical components of computer monitors, and are expected to find significant usage in digital television applications. Commonly used such transformers include elements manufactured by interleaving metalized polyester film with a coated heat sealable polyester film to form coils with an integral resonant capacitor. The coating side is wound against the metalized film and heat-sealed for protection against the corrosion of a final epoxy impregnation. Flyback transformers incorporating wound film capacitors acting simultaneously as resonance capacitors and primary coils are described for example by Okamura in U.S. Pat. No. 5,241,293, incorporated herein by reference. Such flyback transformers have a number of advantages compared to traditional designs involving wire-wound primary coils attached to separate resonance capacitors, including lower space requirements, lower magnetic flux leakage from the outside portion of the secondary coils, and reduction in ringing that otherwise occurs due to undesired resonance between the stray capacitance between the primary coil, and the secondary coil and the secondary leakage inductance.

Film capacitors wound by traditional methods result in an air layer between the film windings. Air layers in these types of high voltage capacitors cause corona discharge resulting in deleterious performance of the dielectric. Traditional wound film capacitors used in flyback transformers thus require impregnation of a resin such as epoxy to eliminate the air layer that exists between the individual film windings. The impregnation step requires a significant amount of manufacturing time to complete which limits the overall production yield. Therefore, elimination of his impregnation step would be advantageous to the high voltage capacitor manufacturer.

Thus there continues to be a need for improved wound film capacitors and methods for their manufacture.

SUMMARY OF THE INVENTION

In one aspect of the invention, there is provided an electrical component comprising:
 a first elongated dielectric layer having superposed over a first surface thereof a metal layer substantially co-extensive with said first surface and over a second surface thereof opposite said first surface a heat-seal layer coextensive with said second surface;
 a second elongated dielectric layer having superposed over a first surface thereof a metal layer substantially co-extensive with said first surface and over a second surface thereof opposite said first surface a heat-seal layer coextensive with said second surface; and
 at least one terminal connected to each of said metal layers;
 wherein said first and said second elongated dielectric layers are superposed with the heat-seal layer of the second dielectric layer in contact with the metal layer of the first dielectric layer and are wound together to form a substantially cylindrical structure, and wherein each of said dielectric layers and said heat-seal layers superposed thereon has a combined thickness of between about 0.5 $\mu$m and about 500 $\mu$m and wherein said heat-seal layer constitutes between about 0.5% and about 40% of said combined thickness.

In another aspect of the invention, there is provided a method for making an electrical component comprising:
 (a) forming a first metalized element comprising a dielectric layer having superposed over a first surface thereof a metal layer substantially co-extensive with said first surface and over a second surface thereof opposite said first surface a heat-seal layer coextensive with said second surface;
 (b) forming a second metalized element comprising a dielectric layer having superposed over a first surface thereof a metal layer substantially co-extensive with said first surface and over a second surface thereof opposite said first surface a heat-seal layer coextensive with said second surface;
 (c) positioning said first metalized element over said second metalized element so that said metal layer of said first metalized element is in contact with said heat-seal layer of said second metalized element, and winding both metalized elements to form a generally cylindrical shape; and
 (d) applying sufficient heat to said metalized elements to adhere said first and said second metalized elements together; and
 (e) providing at least one electrical connection to each of said metal layers.

DETAILED DESCRIPTION OF THE INVENTION

The invention will next be illustrated with reference to the figures, wherein the same numbers indicate the same elements in all figures. Such figures are intended to be illustrative rather than limiting and are included herewith to facilitate the explanation of the invention. The figures are not to scale, and not intended as engineering drawings. Also, it will be appreciated that the devices of the invention may be used for a wide variety of applications, and accordingly the dimensions and materials useful for making them also cover a very wide range, and are sometimes interdependent on each other. Therefore, the invention should not be construed as limited by the materials and dimensions explicitly noted in the Figures and associated text.

Figure 1:
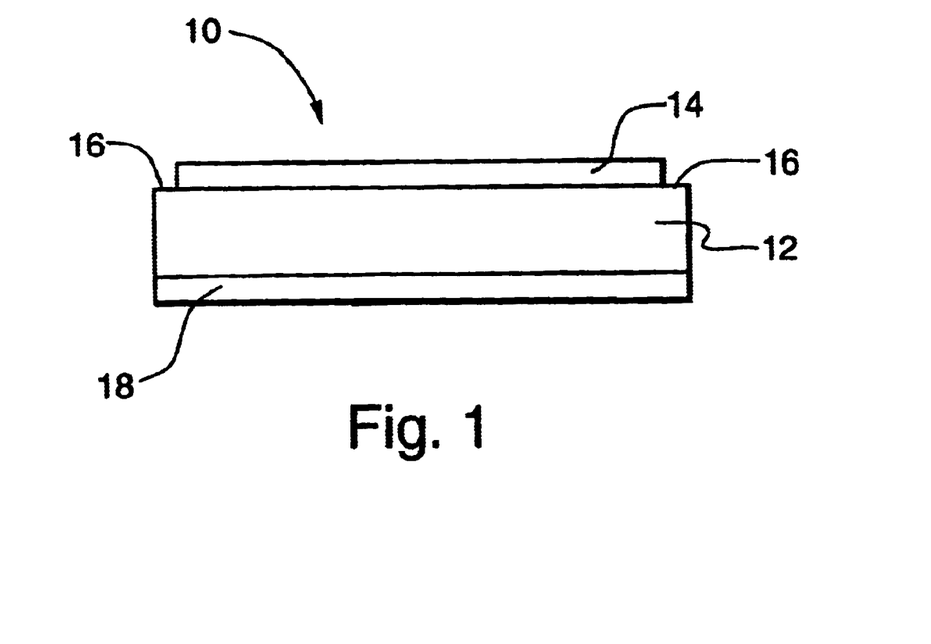
FIG. 1 is an end view of a metalized element for making an electrical component according to one aspect of the invention.

Referring now to FIG. 1, there is shown an end view of a metalized element indicated generally at 10, useful for making an electrical component according to the invention. Such a device may be a wound film capacitor, which may optionally be configured for use in a flyback transformer, as will be illustrated later. Metalized element 10 comprises a dielectric layer 12 with a heat-seal layer 18 on one surface, and a metal layer 14 on the opposite surface. The heat-seal layer covers essentially the entire surface of layer 12, while the metal layer is shown with borders 16 on either side of it. Although two borders are shown in FIG. 1, neither need be present, or there may be only one. The borders, if present, may be from about 0.25 mm to about 5 mm in width. A 1-mm border is typically present on each side.

Dielectric layer 12 typically has a width from about 10 mm to about 500 mm, more typically about 40 mm. The combined thickness of dielectric layer 12 and heat-seal layer 18 is typically from about 0.5 $\mu$m to about 500 $\mu$m, preferably from about 2.5 $\mu$m to about 60 $\mu$m. Heat-seal layer 18 preferably constitutes from 0.5% to 40% of the combined thickness of layers 12 and 18. It is preferably from about 0.1 $\mu$m to about 50 $\mu$m in thickness, and more preferably from about 1 $\mu$m to about 5 $\mu$m.

Layer 12 may comprise any electrically insulating material known in the art, including but not limited to polyethylene, polypropylene, polycarbonate, polyphenylene sulfide, polytetrafluoroethylene, polyethylene oxide, polypropylene oxide, polyetherether ketone and polyvinylidine fluoride, or copolymers of said homopolymers. It may be a polyester film, as is well known to those skilled in the art. In general, dielectric layer 12 may for example be produced from any suitable synthetic linear polyester that may be obtained in highly crystalline form after stretching and heat setting. Preferred polyester films are polyethylene terephthalate (PET) film and polyethylene naphthalate film. The most preferred polyester film is polyethylene terephthalate.

The polymer preparation and film manufacturing processes are well known to those skilled in the art and are disclosed in many texts, such as Encyclopedia of Polymer Science and Engineering, 2nd. Ed., Vol. 12, Wiley, N.Y., pp. 1–313, as well as in numerous patents, such as U.S. Pat. No. 3,107,139. The polymer is typically obtained by condensing the appropriate dicarboxylic acid or its lower alkyl diester with ethylene glycol. Polyethylene terephthalate is formed from terephthalic acid or an ester thereof, and polyethylene naphthalate is formed from 2,7-naphthalenedicarboxylic acid or an ester thereof.

Especially useful is polyethylene terephthalate that has been biaxially oriented and heatset. Such a material is well known in the art, and is described for example in U.S. Pat. No. 4,375,494 to Stokes, incorporated herein by reference. Dielectric layer 12 may also comprise a particulate additive to promote improved handling and winding properties by increasing surface roughness. The additive is typically present in an amount of from about 0.002% to about 0.5%, preferably from about 0.005% to about 0.02%, based on the weight of the polymer. Useful additives, which may be for example particulate materials such as inorganic aluminosilicate clays, silica or alkali or alkaline earth salts.

Especially useful are particulate materials obtained by calcining precursor silicone resin particles by the method disclosed by Siddiqui in International Application No. PCT/US98/26429, filed Dec. 11, 1998 and published Jul. 8, 1999 under International Publication No. WO 99/33910, incorporated herein by reference. Particularly suitable are such particles where about 100 percent have a particle sized below about 6 $\mu$m, and at least about 95 percent have a particle size below about 5 $\mu$m, and 50 percent have a particle size below about 2.2 $\mu$m. The particles typically have an average size of about 2 to about 3 $\mu$m, preferably about 2 to about 2.4 $\mu$m, more preferably about 2.2 $\mu$m. Such materials, due to their narrow particle size distribution and relatively spherical shape, are especially useful when the metalized element is used to make a capacitor for use in a flyback transformer application, where they cause less dielectric loss and pitting at the particle-polymer interface than do most particulate additives.

Heat-seal layer 18 should be capable of forming a bond to itself or to metal layer 14 and/or to dielectric layer 12, or preferably all of these, by heating to soften the polymeric material of the heat-seal layer and applying pressure, at a temperature that does not soften or melt the polymeric material of the dielectric layer. In one embodiment, heat-seal layer 18 has a glass transition temperature that is lower than the glass transition temperature of dielectric layer 12.

Heat-seal layer 18 typically comprises a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Layer 18 may comprise terephthalate-containing polyester. A preferred copolyester is derived from one or more of terephthalic acid, isophthalic acid and hexahydroterephthalic acid and one or more glycols, preferably ethylene glycol. The preferred copolyesters which provide satisfactory heat-sealing properties in the amorphous state are those of ethylene terephthalate and ethylene isophthalate, especially in the molar ratios 60 to 90 mol % ethylene terephthalate and correspondingly 40 to 10 mol % ethylene isophthalate. Particularly preferred copolyesters comprise 70 to 85 mol % ethylene terephthalate and 30 to 15 mol % ethylene isophthalate, for example a copolyester of approximately 80 mol % ethylene terephthalate and approximately 20 mol % ethylene isophthalate.

Dielectric layer 12 in combination with heat-seal layer 18 should have a dielectric strength of at least about 136 volts/$\mu$m, an insulation resistance of at least about 5000 mohm-$\mu$f. More preferably, the combination of dielectric layer 12 and heat-seal layer 18 should have a dielectric strength of at least about 227 volts 1 $\mu$m, an insulation resistance of at least about 10,000 mohm-$\mu$f. One way to achieve these electrical values is to use virgin polyesters for making dielectric layer 12 and heat-seal layer 18, i.e. without any recycled polyester content.

Metal layer 14 typically has a thickness in the range of 10 to 5,000 angstroms, most preferably from about 80 to about 300 angstroms. The layer may comprise any metal. Non-limiting examples of useful metals include aluminum, palladium, zinc, nickel, gold, silver, copper, indium, tin, chromium, titanium, zinc/aluminum alloy, copper/aluminum alloy or copper/zinc/aluminum alloy. Aluminum is most preferred.

Figure 2:
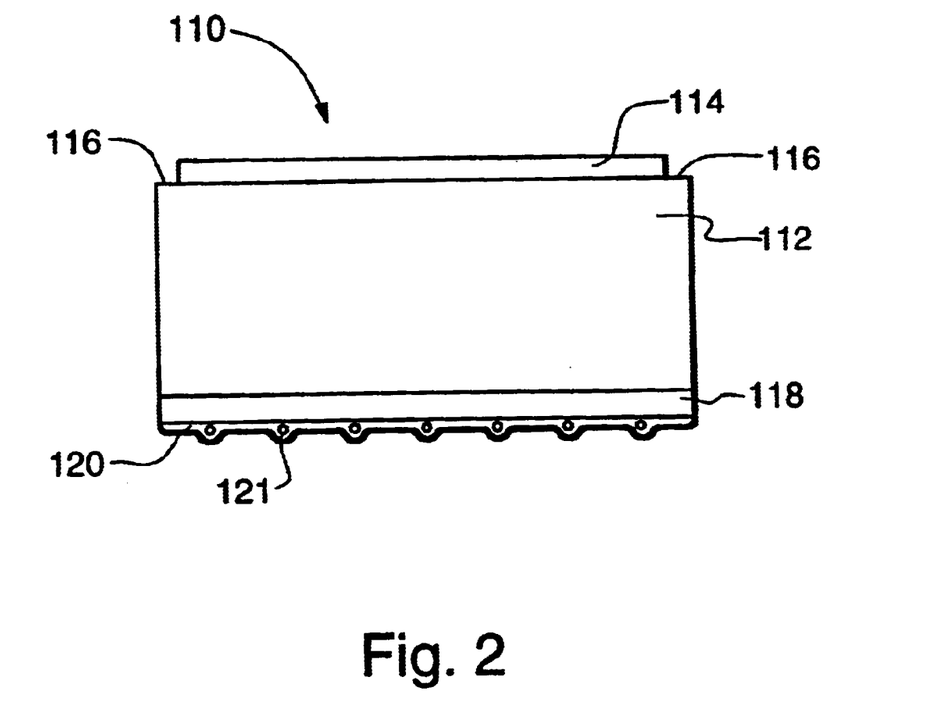
FIG. 2 is an end view of a metalized element similar to that of FIG. 1, showing in addition a slip layer according to another aspect of the invention.

FIG. 2 shows, in another embodiment of this invention, a metalized element 110 comprising a dielectric layer 112, a metal layer 114 having borders 116 on one surface of 112, and a heat-seal layer 118 on the opposite surface of 112. Metalized element 110 additionally comprises, on the surface of heat-seal layer 118 not in contact with dielectric layer 112, a slip layer 120 comprising a particulate slip additive 121. Such a layer is useful for improving the winding properties of the metalized composite when it is formed into a capacitor. Nonlimiting examples of suitable formulations and methods of applying slip layer 120 are described by Berry et al in U.S. Pat. No. 6,656,222, incorporated herein by reference. Such a layer may have a thickness from about 0.05 µm to about 0.4 µm, preferably from about 0.1 µm to about 0.2 µm, and may comprise a water-soluble or water-dispersible acrylic resin containing as a slip additive submicron alumina, zirconia, silica, or a combination of these. Particularly useful is fumed silica having an average primary particle size from about 10 nm to about 500 nm, preferably from about 40 nm to about 50 nm.

The surface provided by such a layer affords excellent handling properties and acceptable heat-sealing properties in film composites comprising a biaxially oriented and heat-set polyethylene terephthalate dielectric layer and a 70 to 85 mol % ethylene terephthalate30 to 15 mol % ethylene isophthalate copolyester heat-seal layer. It may typically provide a static coefficient of friction for the heat-seal layer tested against itself in the range 0.40 to 0.50, and a heat-seal strength measured by sealing the heat-seal layer to itself in the range 40 to 120 N/mm$^2$. The method for determining heat-seal strength is given in the Test Methods section.

Figure 3:
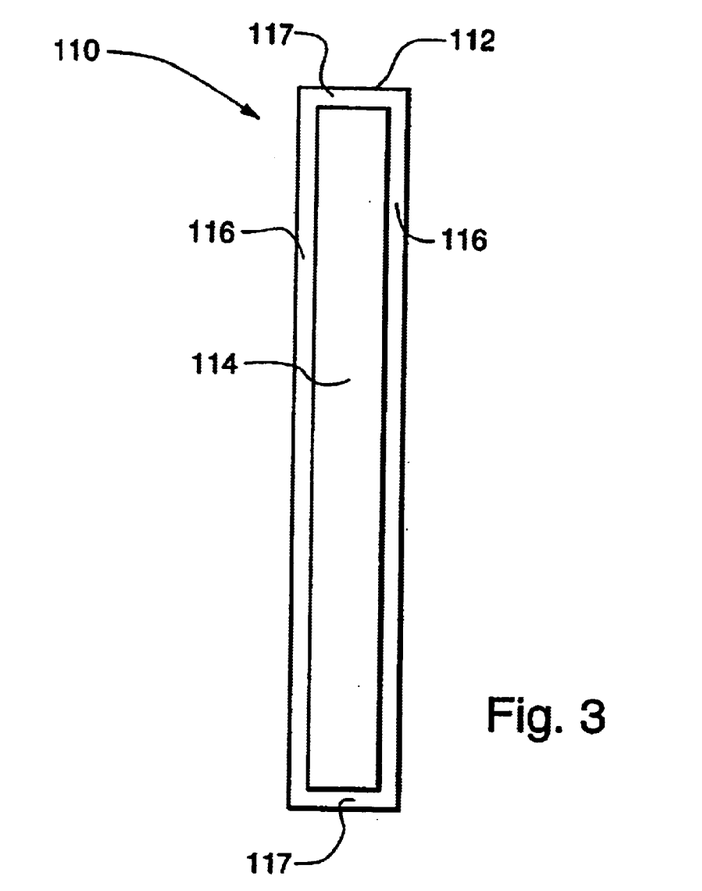
FIG. 3 is a top view of the metalized element of FIG. 2.

FIG. 3 is a top view of the metalized element of FIG. 2, showing optional margins 116 and 117 along the sides and at the ends of metal layer 114, respectively.

Referring to FIG. 2, fabrication of the metalized element 110 may be performed by first forming a film composite comprising dielectric layer 112 and heat-seal layer 118, biaxially orienting the film composite, optionally applying to the surface of heat-seal layer 118 a layer 120 comprising a slip additive 121, heatsetting the film composite, and applying to the dielectric layer 112 a metal layer 114.

The polyester film composite may be formed by solvent casting or extrusion of the heat-seal layer onto the surface of a self-supporting film of the dielectric layer material, which is preferably a biaxially oriented and heat-set film of polyethylene terephthalate. A convenient and alternative process for the manufacture of such a film composite includes multiple extrusion through a multiple orifice die or coextrusion of the composite layers, e.g. broadly as described in U.S. Pat. No. 3,871,947, followed by molecular orientation by stretching in one or more directions and heat setting. A convenient process and apparatus for coextrusion, known as single channel coextrusion, which is described in U.S. Pat. No. 4,165,210 and GB patent specification No. 1,115,007, comprises simultaneously extruding streams of the first and second polyesters from two different extruders, uniting the two streams in a tube leading to a manifold of an extrusion die, and extruding the two polyesters together through the die under conditions of streamline flow so that the two polyesters occupy distinct regions of the flow without intermixing whereby a composite is produced.

Biaxial orientation of the dielectric layer such as a polyethylene terephthalate layer may be accomplished by stretching the film composite in sequence in two mutually perpendicular directions typically at temperatures in the range of about 78 to 125° C.

Generally, the conditions applied for stretching the composite may function to partially crystallize the heat-seal layer and in such cases it is preferred to heat set under dimensional restraint at a temperature greater than the crystalline melting temperature of the heat-seal layer and permit or cause the composite to cool in order to render the heat-seal layer essentially amorphous. Therefore, the stretching operation is preferably followed by heat setting under dimensional restraint typically at a temperature in the range 150 to 250° C. Convenient processes for stretching and heat setting are described in U.S. Pat. No. 3,107,139.

Slip layer 120 may be formed by applying to heat-seal layer 118 a formulation containing a slip additive 121, preferably during an interdraw stage of the biaxial orientation process, that is, after the film has been stretched in one direction but prior to stretching in the orthogonal direction. Techniques for such coating are well known in the art, and are described for example by Chappell, Jr. et al in U.S. Pat. No. 5,985,437, incorporated herein by reference. For example, the coating composition may be applied as an aqueous dispersion at a concentration and amount sufficient to produce a coating with the desired adhesion properties. The coating composition typically comprises about 3% to 18% total solids, preferably about 5% to about 10% total solids. As is well known to those skilled in the art, total solids refers to the total amount of non-volatile material in the coating composition, even though some of these materials may be non-volatile liquids at room temperature.

Any conventional coating method, such as spray coating, roll coating, slot coating, meniscus coating, immersion coating, wire-bar coating, air knife coating, curtain coating, doctor knife coating, direct and reverse gravure coating, and the like, can be used to apply the coating composition. The coating is typically applied as a continuous coating. The wet coating preferably has a thickness of about 7.5 to about 8.5 µm, as measured by wet infrared gauge. After drying, the coating typically has a thickness of about 0.05 µm to about 0.4 µm, preferably, about 0.1 µm to about 0.2 µm. Although coating from a solution or dispersion as described here may be a convenient way of applying slip layer 120, other means such as for example lamination may also be used.

Deposition of metal layer 114 is usually performed by vacuum deposition, by methods and using equipment known in the art. For example, a vacuum deposition apparatus available from Balzers GmbH (Bingen, Germany) may be used. The surface resistance of the resulting layer may be from about 0.9 to about 8 ohm/sq., preferably from about 1.0 to about 3.0 ohm/sq. A typical resistance is 1.25 ohm/sq. Other methods such as electroplating and sputtering may be used, and are well known in the art. The film, either before or after metal deposition, may optionally be subjected to a surface treatment or other coating treatment with a resin which may further improve the metal adhesion, electrical performance or other characteristics as desired.

Figure 4:
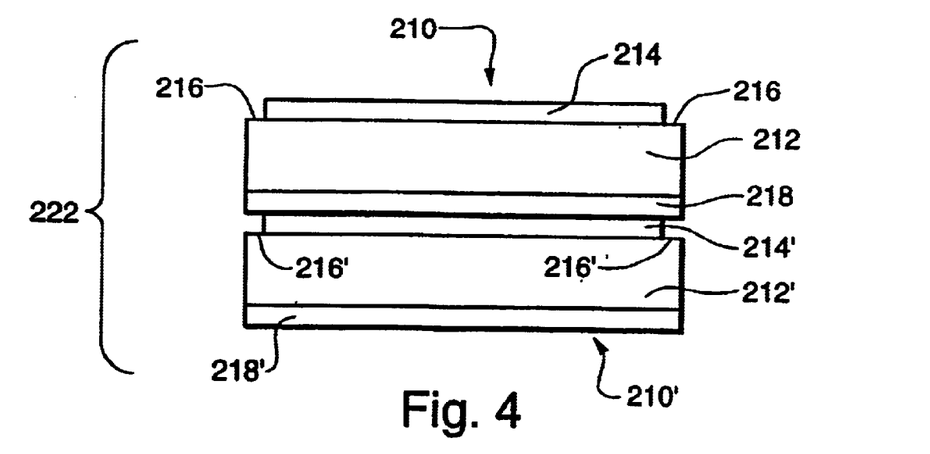
FIG. 4 is an end view of a pre-winding assembly for making an electrical component according to the invention.

Referring now to FIG. 4, there is shown an end view of a pre-winding assembly, indicated generally at 222, comprising two metalized elements 210 and 210' in position for being wound to make an electrical component in accordance with this invention. Metalized elements 210 and 210' are shown overlaid such that they are adjacent and substantially coextensive with each other, with heat-seal layer 218 of metalized element 210 shown adjacent metal layer 214' of metalized element 210'. Preferably, metalized elements 210 and 210' comprise slip layers such as shown at 120 in FIG. 2. For simplicity, these are not shown in FIGS. 4, 5, and 6.

Figure 5:
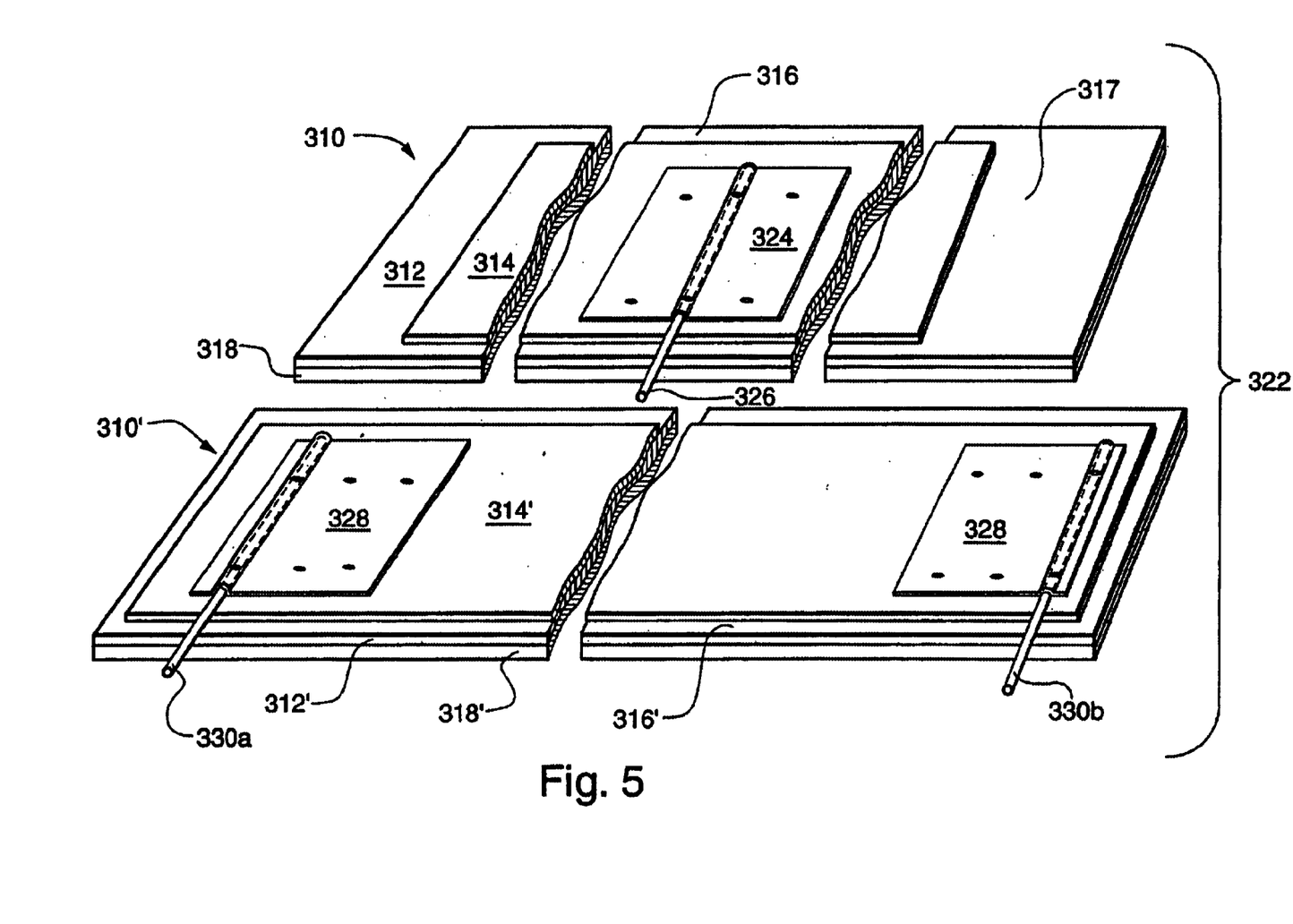
FIG. 5 is an exploded view of a pre-winding assembly for making an electrical component suitable for use in a flyback transformer, according to the invention.

FIG. 5 shows an exploded view of a pre-winding assembly similar to that of FIG. 4, indicated generally at 322. The assembly, which is suitable for making an electrical component for a flyback transformer, additionally shows terminals 330a and 330b attached via connectors 328 to the ends of metal layer 314' of metalized element 310', and a terminal 326 attached via a connector 324 to metal layer 314 of metalized element 310. In the embodiment shown, metalized element 310 overlies 310', but this may be reversed.

Also, in the embodiment shown, the terminals are sandwiched in place by the connectors, which are typically aluminum films spot-welded in place to the metal layers. Other means of connecting terminals are known in the art, and are contemplated by this invention. The number and positioning of terminals 326, 330a and 330b shown in FIG. 5 are especially suitable for use in preparing a capacitor capable of operating as both the primary coil of a flyback transformer and as a capacitor electrically connected thereto. However, the invention also contemplates other numbers and positioning of terminals, depending on the requirements of the finished device. As a nonlimiting example, elimination of either of terminals 330a and 330b, optionally with repositioning of terminal 326 and/or the other of 330a and 330b, may result in a pre-winding assembly suitable for making a simple capacitor. Other possible arrangements of terminals will be apparent to those of skill in the art.

Figure 6:
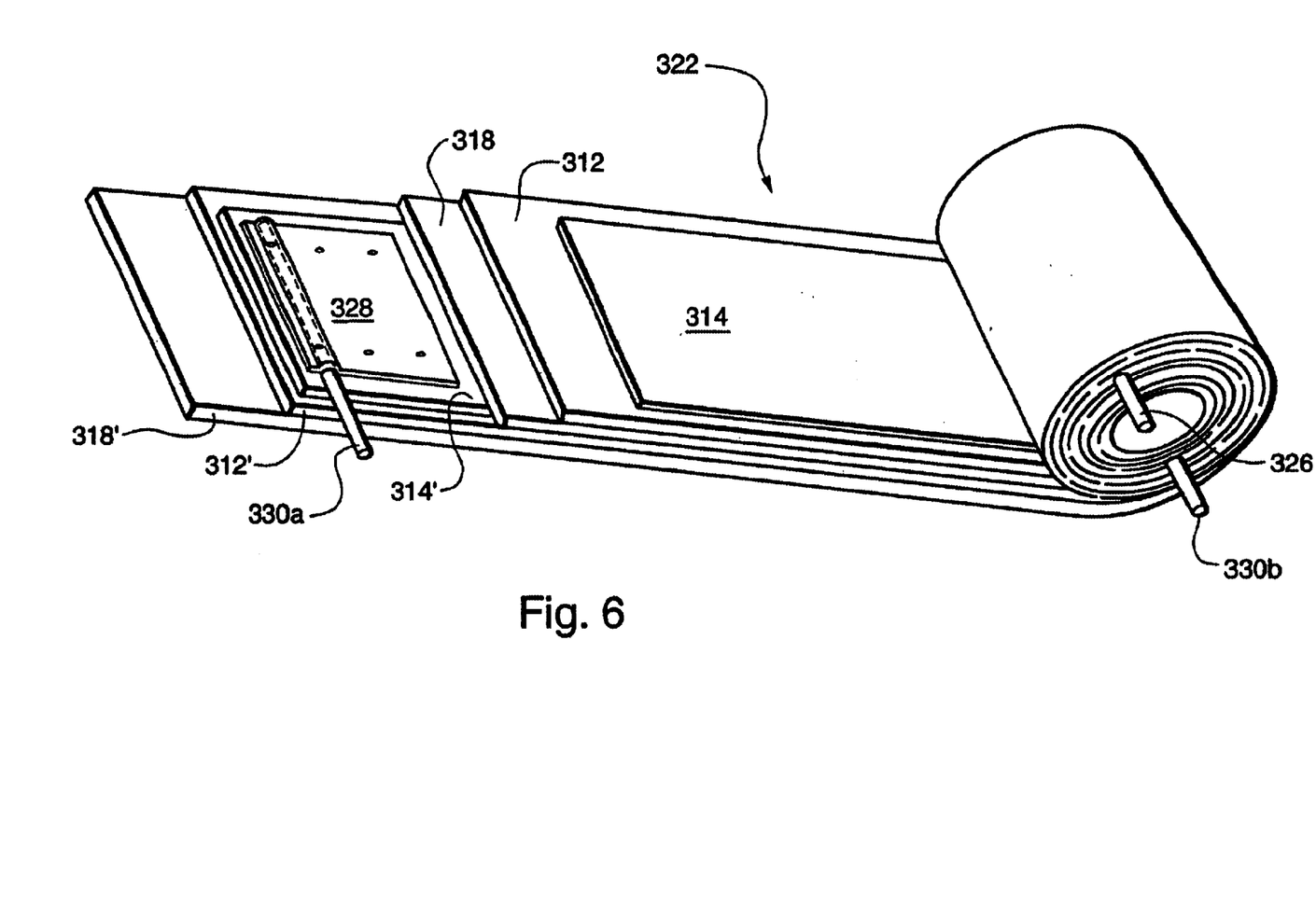
FIG. 6 is a perspective view of the pre-winding assembly of FIG. 5, partially wound up, with layers partially cut away.

FIG. 6 shows a partial section view of the pre-winding assembly of FIG. 5, partially wound up. The winding may be done such that the resulting wound assembly has heat-seal layer 318' outermost, as shown in this embodiment, but it may instead be wound with metal layer 314 outermost.

To make the capacitor, the pre-winding assembly 322 is wound up to produce a wound assembly, which is then hot-pressed to cause the heat-seal layers on each of metalized elements 310 and 310' to adhere to the other metalized element. Typically this may be done under a pressure of about 40 kg/cm² at a temperature of about 140° C. for about 5 minutes. Winding equipment such as is available from Metar (Metan, Switzedand) may for example be used for this operation, according to commonly used methods. Hot-pressing may for example be performed using apparatus available from Thermal Technology, Santa Rosa, Calif. This is typically followed by the application of a liquid epoxy resin, commonly one based on bisphenol A, to coat and seal the capacitor. A commonly used resin is EPALLOY 5000, available from CVC, Maple Shade, N.J. Other coating and sealing compositions might also be used, as are known in the art.

TEST METHODS

Heat-seal Strength Measurement

Heat-seal strength is measured by sealing the heat-seal layer to itself or to the dielectric layer at 140° C. for 0.5 second under a pressure of 103 kPa (15 psi), cooling to room temperature, and measuring the force required under linear tension per unit width of seal to peel the sealed films apart at a constant speed of 5.08 mm/second. Heat-seal values are quoted as the heat-seal strength for a film composite consisting of a dielectric layer and a heat-seal layer wherein the heat-seal layer comprises 20% of the total composite thickness.

Electrical Property Measurements

The dielectric strength of film capacitors is tested according to the JIS standard using the average dielectric breakdown voltage per micron of film thickness for 100 capacitors tested at a ramp rate of 100 DC volts/second to failure (ASTM method 2318).

The insulation resistance measurement is done by measuring the average resistance and capacitance of 100 wound film-foil capacitors at 360 volts and at 25° C. The property is then expressed as the product of resistivity and capacitance in megohms-microfarad (mohm-$\mu$f).

Having described the invention, we now claim the following and their equivalents.

What is claimed is:

1. An electrical component comprising:
   a first elongated dielectric layer having superposed over a first surface thereof a metal layer substantially co-extensive with said first surface and over a second surface thereof opposite said first surface a heat-seal layer coextensive with said second surface;
   a second elongated dielectric layer having superposed over a first surface thereof a metal layer substantially co-extensive with said first surface and over a second surface thereof opposite said first surface a heat-seal layer coextensive with said second surface; and
   at least one terminal connected to each of said metal layers;
   wherein said first and said second elongated dielectric layers are superposed with the heat-seal layer of the second dielectric layer in contact with the metal layer of the first dielectric layer and are wound together to form a substantially cylindrical structure, and wherein each of said dielectric layers and said heat-seal layers superposed thereon has a combined thickness of between about 0.5 $\mu$m and about 500 $\mu$m and wherein said heat-seal layer constitutes between about 0.5% and about 40% of said combined thickness.

2. The electrical component according to claim 1 wherein at least one of said heat-seal layers further comprises, on a surface thereof, submicron particulate matter.

3. The electrical component according to claim 2 wherein said submicron particulate matter comprises at least one of alumina, silica and zirconia particles.

4. The electrical component according to claim 1 wherein each of the heat-seal layers has a glass transition temperature that is lower than the glass transition temperature of the dielectric layer upon which said heat-seal layer resides.

5. The electrical component of claim 1 wherein said metal layer comprises aluminum.

6. The electrical component of claim 1 wherein at least one of said first and second dielectric layers comprises biaxially oriented polyethylene terephthalate.

7. The electrical component of claim 6 wherein said at least one dielectric layer comprises particulate material obtained by calcining precursor silicone resin particles.

8. The electrical component of claim 6 wherein the combined thickness of said at least one dielectric layer and said heat-seal layer superposed on a second surface thereof is from about 2.5 $\mu$m to about 60 $\mu$m.

9. The electrical component of claim 1 wherein at least one of said first and second dielectric layers comprises biaxially oriented polyethylene naphthalate.

10. The electrical component of claim 1 wherein said at least one heat-seal layer comprises an amorphous copolyester of about 60 to about 90 mol % ethylene terephthalate and correspondingly about 40 to about 10 mol % ethylene isophthalate.

11. The electrical component of claim 1 wherein each of said dielectric layers, combined with said heat-seal layer superposed thereon, has a dielectric strength of at least about 136 volts/$\mu$m and an insulation resistance of at least about 5000 mohm-$\mu$f.

12. The electrical component of claim 1 wherein each of said metal layers has two ends and a center, and at least one terminal connected to each of said metal layers; and wherein said at least one terminal connected to one of said metal layers is connected in substantially the center of the metal layer superposed over one of said first and second dielectric layers; and said at least one terminal connected to the other of said metal layers is connected at one of said two ends of the metal layer superposed over the other of said first and second dielectric layers.

13. The electrical component of claim 1 wherein:

said first elongated dielectric layer having superposed over a first surface thereof a metal layer substantially co-extensive with said first surface and over a second surface thereof opposite said first surface a heat-seal layer coextensive with said second surface; and said second elongated dielectric layer having superposed over a first surface thereof a metal layer substantially co-extensive with said first surface and over a second surface thereof opposite said first surface a heat-seal layer coextensive with said second surface;

are substantially identical.

14. An electrical component comprising:

a first elongated dielectric layer having superposed over a first surface thereof an aluminum layer substantially co-extensive with said first surface and over a second surface thereof opposite said first surface a heat-seal layer coextensive with said second surface; and a second elongated dielectric layer having superposed over a first surface thereof an aluminum layer substantially co-extensive with said first surface and over a second surface thereof opposite said first surface a heat-seal layer coextensive with said second surface;

wherein said first and said second elongated dielectric layers are superposed with the heat-seal layer of the second dielectric layer in contact with the aluminum layer of the first dielectric layer and are wound together to form a substantially cylindrical structure, and wherein each of said dielectric layers and said heat-seal layer superposed thereon has a combined thickness of between about 2.5 $\mu$m and about 60 $\mu$m and wherein said heat-seal layer constitutes between about 0.5% and about 40% of said combined thickness;

wherein both of said first and second dielectric layers comprise biaxially oriented polyethylene terephthalate and particulate material obtained by calcining precursor silicone resin particles;

wherein both of said heat-seal layers comprise an amorphous copolyester of about 80 mol % ethylene terephthalate and about 40 to about 20 mol % ethylene isophthalate, comprising, on a surface thereof, submicron silica particles;

wherein each of said aluminum layers has two ends and a center, the electrical component further comprising:

a terminal connected in substantially the center of the aluminum layer superposed over one of said first and second dielectric layers; and a terminal connected at each of said two ends of the aluminum layer superposed over the other of said first and second dielectric layers.

15. A method for making an electrical component, the method comprising:

(a) forming a first metalized element comprising a dielectric layer having superposed over a first surface thereof a metal layer substantially co-extensive with said first surface and over a second surface thereof opposite said first surface a heat-seal layer coextensive with said second surface;

(b) forming a second metalized element comprising a dielectric layer having superposed over a first surface thereof a metal layer substantially co-extensive with said first surface and over a second surface thereof opposite said first surface a heat-seal layer coextensive with said second surface;

(c) positioning said first metalized element over said second metalized element so that said metal layer of said first metalized element is in contact with said heat-seal layer of said second metalized element, and winding both metalized elements to form a generally cylindrical shape;

(d) applying sufficient heat to said metalized elements to adhere said first and said second metalized elements together; and (e) providing at least one electrical connection to each of said metal layers.

16. The method of claim 15 wherein at least one of said heat-seal layers further comprises, on a surface thereof, submicron particulate matter.

17. The method of claim 16 wherein said submicron particulate matter comprises at least one of alumina, silica and zirconia particles.

18. The method of claim 15 wherein each of the heat-seal layers has a glass transition temperature that is lower than the glass transition temperature of the dielectric layer upon which said heat-seal layer resides.

19. The method of claim 15 wherein said metal layer comprises aluminum.

20. The method of claim 15 wherein at least one of said dielectric layers comprises biaxially oriented polyethylene terephthalate.

21. The method of claim 20 wherein said at least one dielectric layer comprises particulate material obtained by calcining precursor silicone resin particles.

22. The method of claim 20 wherein the combined thickness of said at least one dielectric layer and said heat-seal layer superposed on a second surface thereof is from about 2.5 $\mu$m to about 60 $\mu$m.

23. The method of claim 15 wherein said at least one heat-seal layer comprises an amorphous copolyester of about 60 to about 90 mol % ethylene terephthalate and correspondingly about 40 to about 10 mol % ethylene isophthalate.

24. The method of claim 15 wherein each of said dielectric layers, combined with said heat-seal layer superposed thereon, has a dielectric strength of at least about 136 volts/$\mu$m and an insulation resistance of at least about 5000 mohm-$\mu$f.

25. The method of claim 15 wherein each of said metal layers has two ends and a center, and wherein said providing at least one electrical connection to each of said metal layers comprises:

(i) providing an electrical connection in substantially the center of the metal layer of one of said first and second metalized elements; and (ii) providing an electrical connection at each of said two ends of the metal layer of the other of said first and second metalized elements.

26. A method for making an electrical component for a flyback transformer comprising a wound film capacitor integral with a primary coil, the method for making said component comprising:

(a) forming a first metalized element comprising a dielectric layer having superposed over a first surface thereof an aluminum layer substantially co-extensive with said first surface and over a second surface thereof opposite said first surface a heat-seal layer coextensive with said second surface;

(b) forming a second metalized element comprising a dielectric layer having superposed over a first surface thereof an aluminum layer substantially co-extensive with said first surface and over a second surface thereof opposite said first surface a heat-seal layer coextensive with said second surface;

(c) positioning said first metalized element over said second metalized element so that said aluminum layer of said first metalized element is in contact with said heat-seal layer of said second metalized element, and winding both metalized elements to form a generally cylindrical shape;

(d) applying sufficient heat to said metalized elements to adhere said first and said second metalized elements together; and (e) providing at least one electrical connection to each of said aluminum layers;

wherein each of said dielectric layers and said heat-seal layer superposed thereon has a combined thickness of between about 2.5 µm and about 60 µm and wherein said heat-seal layer constitutes between about 0.5% and about 40% of said combined thickness;

wherein both of said layers comprise biaxially oriented polyethylene terephthalate and particulate material obtained by calcining precursor silicone resin particles;

wherein both of said heat-seal layers comprise an amorphous copolyester of about 80 mol % ethylene terephthalate and about 40 to about 20 mol % ethylene isophthalate, comprising, on a surface thereof, submicron silica particles;

wherein each of said aluminum layers has two ends and a center; and wherein said providing at least one electrical connection to each of said aluminum layers comprises:
 (i) providing an electrical connection in substantially the center of the aluminum layer of one of said first and second metalized elements; and
 (ii) providing an electrical connection at each of said two ends of the aluminum layer of the other of said first and second metalized elements.

* * * * *

UNITED STATES PATENT AND TRADEMARK OFFICE
CERTIFICATE OF CORRECTION

PATENT NO.   : 6,788,182 B2
DATED        : September 7, 2004
INVENTOR(S)  : Young et al.

It is certified that error appears in the above-identified patent and that said Letters Patent is hereby corrected as shown below:

Column 12,
Line 3, after "wherein both of said," insert -- dielectric --

Signed and Sealed this

Seventeenth Day of May, 2005

JON W. DUDAS
*Director of the United States Patent and Trademark Office*